US010331673B2

(12) United States Patent
Adderly et al.

(10) Patent No.: US 10,331,673 B2
(45) Date of Patent: Jun. 25, 2019

(54) APPLYING LEVEL OF PERMANENCE TO STATEMENTS TO INFLUENCE CONFIDENCE RANKING

(71) Applicant: International Business Machines Corporation, Armonk, NY (US)

(72) Inventors: Darryl M. Adderly, Morrisville, NC (US); Corville O. Allen, Morrisville, NC (US); Scott N. Gerard, Wake Forest, NC (US); Robert K. Tucker, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 14/551,223

(22) Filed: Nov. 24, 2014

(65) Prior Publication Data

US 2016/0147757 A1     May 26, 2016

(51) Int. Cl.
| | |
|---|---|
| *G06F 17/30* | (2006.01) |
| *G06F 16/2457* | (2019.01) |
| *G06N 5/02* | (2006.01) |
| *G06F 16/2458* | (2019.01) |
| *G06F 16/332* | (2019.01) |

(52) U.S. Cl.
CPC .... *G06F 16/24573* (2019.01); *G06F 16/2477* (2019.01); *G06F 16/24575* (2019.01); *G06F 16/3329* (2019.01); *G06N 5/02* (2013.01)

(58) Field of Classification Search
CPC ......... G06F 17/30525; G06F 17/30528; G06F 17/30551; G06F 17/30654; G06F 16/24573; G06F 16/2477; G06F 16/24575; G06F 16/3329; G06N 5/02

USPC ........................................................ 707/748
See application file for complete search history.

(56) References Cited

U.S. PATENT DOCUMENTS

| | | | | |
|---|---|---|---|---|
| 7,587,387 | B2 * | 9/2009 | Hogue | .................. G06F 16/951 |
| 7,676,520 | B2 | 3/2010 | Liu et al. | |
| 8,666,928 | B2 | 3/2014 | Tunstall-Pedoe | |
| 8,682,647 | B1 * | 3/2014 | Lee | ..................... G06F 16/3329 |
| | | | | 704/9 |
| 9,396,268 | B2 * | 7/2016 | Effrat | .................... G06F 16/951 |
| 9,471,689 | B2 * | 10/2016 | Allen | .................. G06F 16/9535 |
| 2005/0086045 | A1 | 4/2005 | Murata | |
| 2007/0196804 | A1 * | 8/2007 | Yoshimura | ............... G09B 7/02 |
| | | | | 434/323 |
| 2008/0126319 | A1 * | 5/2008 | Bukai | ..................... G06F 16/35 |

(Continued)

OTHER PUBLICATIONS

Adderly et al., "Applying Level of Permanence to Statements to Influence Confidence Ranking," U.S. Appl. No. 14/860,959, filed Sep. 22, 2015, 40 pages.

(Continued)

*Primary Examiner* — Thanh-Ha Dang
(74) *Attorney, Agent, or Firm* — VanLeeuwen & VanLeeuwen; Diana R. Gerhardt

(57) ABSTRACT

An approach is provided to identify permanence data corresponding to terms included in a corpus of a question answering (QA) system. Based on the identified permanence, a time-based confidence of each of the terms is established. Terms are identified as a plurality of candidate answers to a question posed to the QA system. Each of the plurality of candidate answers are scored with the scoring being at least partially based on the time-based confidence established for each of the terms.

12 Claims, 10 Drawing Sheets

(56) References Cited

U.S. PATENT DOCUMENTS

| | | | |
|---|---|---|---|
| 2009/0043749 A1* | 2/2009 | Garg | G06F 16/3338 |
| 2009/0070311 A1* | 3/2009 | Feng | G06F 16/3329 |
| 2009/0112828 A1 | 4/2009 | Rozenblatt | |
| 2009/0287678 A1* | 11/2009 | Brown | G06F 17/28 |
| 2011/0125734 A1* | 5/2011 | Duboue | G09B 7/00 707/723 |
| 2011/0307435 A1 | 12/2011 | Overell et al. | |
| 2012/0077178 A1* | 3/2012 | Bagchi | G09B 7/00 434/362 |
| 2012/0078889 A1* | 3/2012 | Chu-Carroll | G06F 16/24578 707/723 |
| 2012/0084293 A1* | 4/2012 | Brown | A61B 5/00 707/741 |
| 2012/0089622 A1* | 4/2012 | Fan | G06F 16/334 707/749 |
| 2013/0007055 A1* | 1/2013 | Brown | F16H 1/28 707/769 |
| 2013/0013615 A1* | 1/2013 | Brown | A61B 5/00 707/741 |
| 2013/0017523 A1* | 1/2013 | Barborak | G09B 7/04 434/322 |
| 2013/0018652 A1* | 1/2013 | Ferrucci | G06F 16/3329 704/9 |
| 2013/0052630 A1* | 2/2013 | Mine | G09B 7/02 434/353 |
| 2013/0066886 A1* | 3/2013 | Bagchi | G06F 16/3329 707/749 |
| 2013/0124653 A1* | 5/2013 | Vick | H04L 51/32 709/206 |
| 2013/0132308 A1 | 5/2013 | Boss et al. | |
| 2013/0158984 A1 | 6/2013 | Myslinski et al. | |
| 2013/0304730 A1* | 11/2013 | Zhou | G06Q 30/02 707/723 |
| 2014/0164304 A1* | 6/2014 | Bagchi | G06N 5/02 706/46 |
| 2015/0074095 A1* | 3/2015 | Enders | G06F 17/27 707/725 |
| 2015/0269152 A1* | 9/2015 | Rekhi | G06Q 10/047 707/748 |
| 2016/0162492 A1* | 6/2016 | Bufe, III | G06F 16/24578 707/723 |
| 2016/0335647 A1 | 11/2016 | Rebrovick et al. | |
| 2017/0140304 A1* | 5/2017 | Beamon | G06N 20/00 |
| 2017/0154043 A1* | 6/2017 | Brown | A61B 5/00 |

OTHER PUBLICATIONS

"List of IBM Patents or Patent Applications Treated as Related," Letter from Leslie A. Van Leeuwen, Sep. 22, 2015, 1 page.

Bertino et al., "High-Assurance Integrity Techniques for Databases," Purdue University, Sharing Data, Information and Knowledge Lecture Notes in Computer Science, 2008, vol. 5071/2008, pp. 244-256.

Bufe et al., "Confidence Rankings of Answers Based on Temporal Semantics," U.S. Appl. No. 14/248,762, filed Apr. 9, 2014, 46 pages.

High, Rob, "The Era of Cognitive Systems: An Inside Look at IBM Watson and How it Works," IBM Corporation, Redbooks, 2012, 16 pages.

Ludovic et al., "Using temporal cues for segmenting texts into events," Proceedings of the 7th International Conference on Advances in Natural Language Processing (IceTAL'10), Reykjavik, Iceland, Aug. 16-18, 2010, pp. 150-161. (Abstract Only).

Taboada, et al., "Lexicon-Based Method for Sentiment Analysis," Submission received: Dec. 14, 2009, revised submission received: Aug. 22, 2010, Accepted for publication Sep. 28, 2010, 2011 Association for Computational Linguistics, vol. 37, No. 2, pp. 267-308.

Yuan, Michael J., "Watson and healthcare, How natural language processing and semantic search could revolutionize clinical decision support," IBM developerWorks, IBM Corporation, Apr. 12, 2011, 14 pages.

"List of IBM Patents or Patent Applications Treated as Related," Letter from Leslie A. Van Leeuwen, Nov. 21, 2017, 1 page.

Oh et al., "Why question answering using sentiment analysis and word classes," Proc. of the 2012 Joint Conf. on Empirical Methods in Natural Language Processing and Computational Natural Language Learning (Jul. 2012), pp. 368-378.

Kalyanpur et al., "Structured Data and Inference in DeepQA," IBM Journal of Research and Development, vol. 56 No. 3/4, Paper 10 (May/Jul. 2012), 14 pages.

Yu et al., "On the temporal dimension of search," Proceedings of the 13th International World Wide Web conference on Alternate track papers & posters, ACM 2004, May 2004, 2 pages.

Gondek et al., "A framework for merging and ranking of answers in DeepQA," IBM Journal of Research and Development, vol. 56, No. 3/4, Paper 14 (May/Jul. 2012), 12 pages.

Chu-Carroll et al, "Finding needles in the haystack: Search and candidate generation," IBM Journal of Research and Development, vol. 56, No. 3/4, Paper 6 (May/Jul. 2012), 12 pages.

Ferrucci, "Introduction to 'This is Watson'," IBM Journal of Research and Development, vol. 56, No. 3/4, Paper 1 May/Jul. 2012), 15 pages.

Dong et al., "Towards recency ranking in web search," Proceedings of the third ACM International Conference on Web search and data mining, ACM, Feb. 2010, 10 pages.

Efron et al., "Estimation methods for ranking recent information," Proceedings of the 34th International ACM SIGIR conference on Research and development in Information Retrieval, ACM, Jul. 2011, 10 pages.

Hawksey, "Sentiment Analysis of tweets: Comparison of Virall- and Text-Processing Sentiment APIs," MASHe, Nov. 2011, 4 pages.

Nakagawa, "Dependency Tree-based Sentiment Classification using CRFs with Hidden Variables," Association for Computational Linguistics, Human League Technologies: The 2010 Annual Conference of the North American Chapter of the ACL, Los Angeles, California, Jun. 2010, pp. 786-794.

\* cited by examiner

APPLYING LEVEL OF PERMANENCE TO STATEMENTS TO INFLUENCE CONFIDENCE RANKING

BACKGROUND

Intelligence statements generally have a shelf life; confidence in them often decays as the statement grows older for a number of reasons. Depending on how long ago the statement was made, by whom it was said, and the content of the statement, analysts might treat intelligence differently, or discount it completely. For example, a person's description might be wholly accurate for only a few hours, as the subject might change appearance characteristics soon after the statement was made. Some types of characteristics, such as height and weight, can take longer to change, while other characteristics might be permanent. Financial structures and assets have a shelf life based on the asset type, influence from external factors and acceptable trading guidelines. Statements that relate to a financial asset may need to be adjusted based on several of these factors and in some cases discounted.

BRIEF SUMMARY

According to one embodiment of the present disclosure, an approach is provided to identify permanence data corresponding to terms included in a corpus of a question answering (QA) system. Based on the identified permanence, a time-based confidence of each of the terms is established. Terms are identified as a plurality of candidate answers to a question posed to the QA system. Each of the plurality of candidate answers are scored with the scoring being at least partially based on the time-based confidence established for each of the terms.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
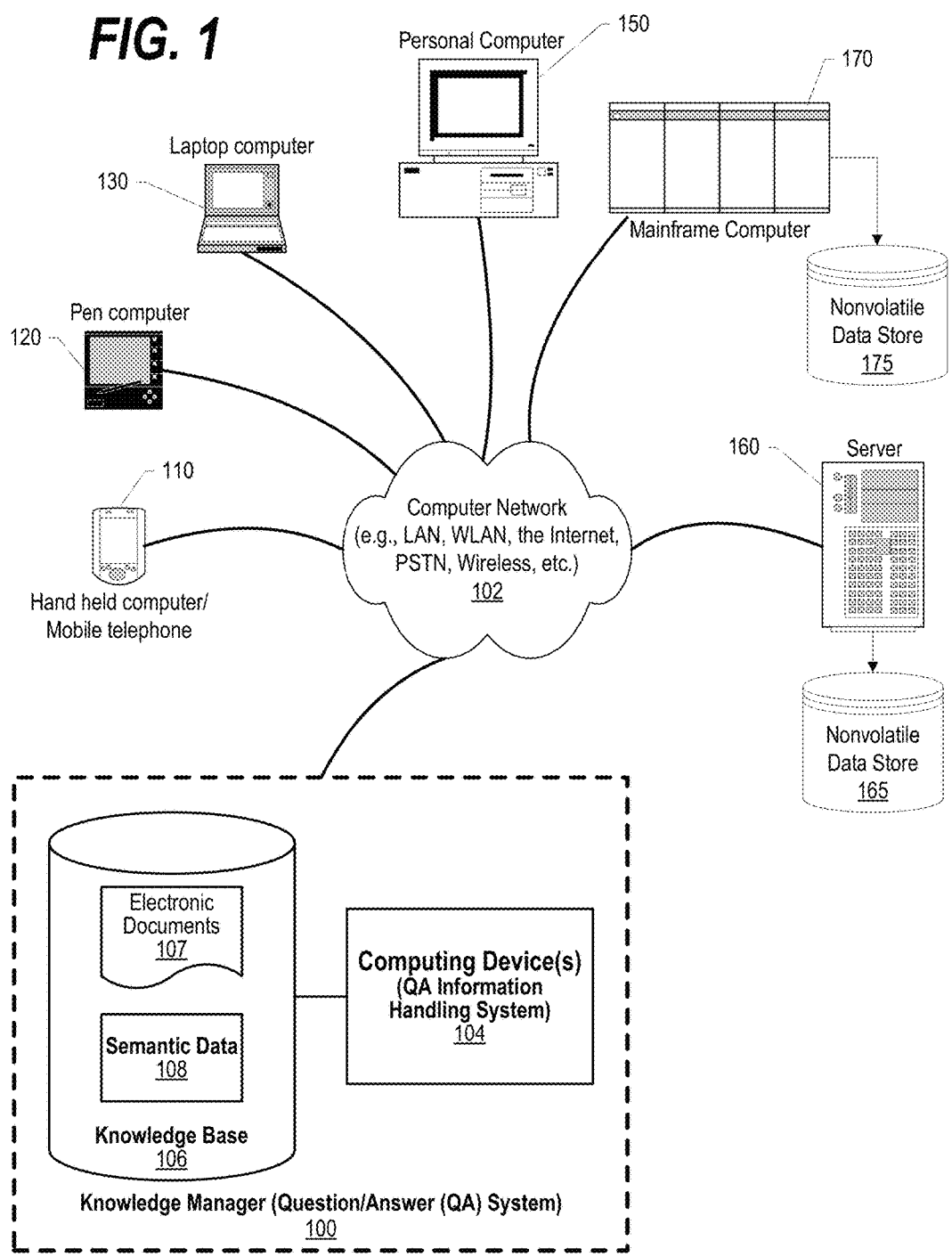
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Red books, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
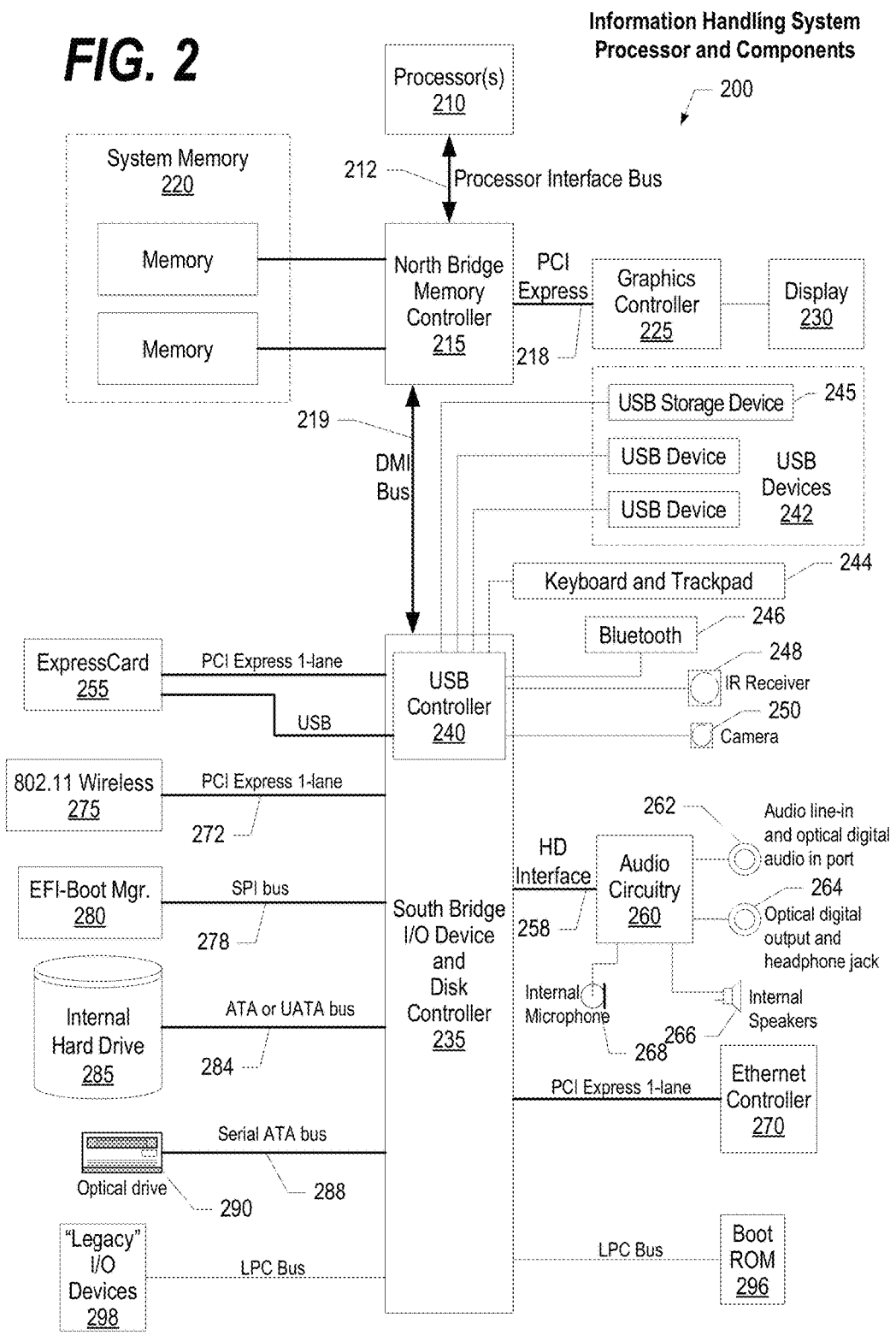
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-10 depict an approach that applies a level of permanence to statements to influence confidence ranking of answers and data from a question/answering (QA) system. The core idea of this disclosure is to establish a permanence to statements attached to an entity relationship which is used to rank statements and inferences when making a decision about a set of candidate answers and, finally, intelligence conclusions from a QA system. On a broader scale, this is to establish permanence for entity relationships and inferencing when used in scoring in a QA system, or a cognitive decision making system. The described mechanism models permanence characteristics of statements and adds metadata to intelligence statements (e.g. always true, true at a point in time, reducing confidence over time utilizing different models, etc.), uses permanence metadata to rank intelligence in searches, and uses permanence characteristics to improve the accuracy of inferences in data.

Figure 3:
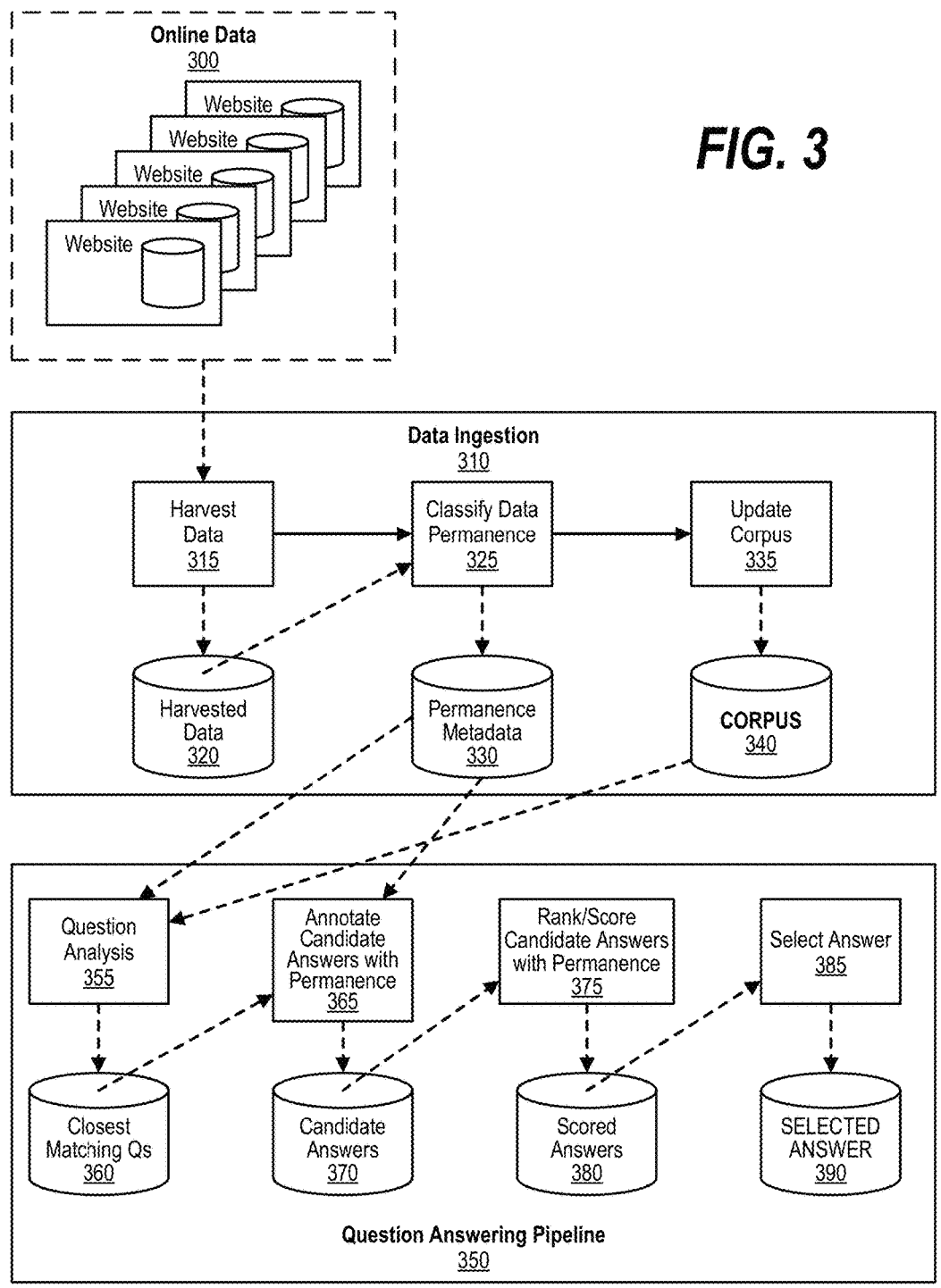
FIG. 3 is a component diagram depicting the various components in applying a level of permanence to statements to influence confidence ranking of such statements.

FIG. 3 is a component diagram depicting the various components in applying a level of permanence to statements to influence confidence ranking of such statements. Web sites 300 can include any number of web sites with various types of material and content. Discussion ingestion phase 310 is used to gather data from web sites 300 and update a corpus (corpus 340) that is utilized by the question answering system. The question answering phase is handled by question answering pipeline 350 that utilizes the corpus provided by the discussion ingestion phase in order to identify candidate answers as well as to select the most likely answer from the candidate answers.

Discussion ingestion 310 commences with process 315 that harvests the data from web sites 300 stores the harvested material in data store 320. Next, process 325 is used to classify the data permanence of the material that was harvested during process 315. The result of process 325 is permanence metadata that describes the permanence of data included in harvested data 320. The permanence metadata is stored in data store 330. Finally, process 335, updates the corpus used by the question answering system. Process 335 utilizes the permanence metadata from data store 330 in order to provide a permanence and related confidence level to data that is included in the corpus which is stored in data store 340.

Question answering pipeline 350 commences with process 355 that performs a question analysis using the updated corpus that is stored in data store 340. The question analysis results in one or more questions that most closely match the requested question. The closest matching questions are stored in data store 360. Next, process 365 generates candidate answers based on the questions that were identified by process 355 and annotates such candidate answers using permanence metadata retrieved from data store 330. The candidate answers are stored in data store 370.

Process 375 is performed to rank and score the candidate answers using a variety of factors, including permanence metadata pertaining to the candidate answers. For example, if a question regarded the hair length of an actor and the candidate answer was from a source, such as a newspaper, that published five years ago, the confidence of such answer would be degraded and the answer from a source that was only one week old would be enhanced. However, for a different type of characteristic, such as the height of the same adult actor, the adult height might be deemed relatively stable so that the five year old source may have a confidence level similar to the source that was one week ago.

In telephone number example, various phone numbers can be associated with a person. Permanence metadata regarding phone numbers might depend on the type of phone number that is associated with the person. A mobile phone number 1-555-545-5555 with a mobile carrier might have a permanence data of two or more years based on contract terms. However, another phone number, such as a phone number assigned on a month-to-month plan, even with the same carrier might have a much different permanence metadata applied (e.g., one month, etc.) because of the shorter term of the contract and the manner in which consumers utilize such devices. Finally, a phone number assigned to a home-based "land line" phone land might have a five year permanence duration based on factors such as how long a person is likely to live at particular location.

Using the above phone number example, if the QA system is searching for a phone number associated with an individual, the confidence value of the phone numbers found (candidate answers) will be based on the type of phone number that was found. If the QA system identifies a land line phone number that was published two years ago, and a month-to-month phone number that was published six months ago, it is likely that the candidate answer with the older land-line phone number will have a higher confidence value, and will be scored higher, than the candidate answer with the newer month-to-month phone number because the confidence in the month-to-month phone number decays much more rapidly than the confidence in the land-line phone number.

The result of process 375 is a set of scored candidate answers that are stored in data store 380. Finally, process 385 selects the most likely correct answer, or answers, based on the scores (e.g., the candidate answer with the highest score, etc.). The candidate answer that is the most likely correct answer is stored in data store 390 and is conveyed to a user of the question answering system as the most likely correct answer to the question posed by the user.

Figure 4:
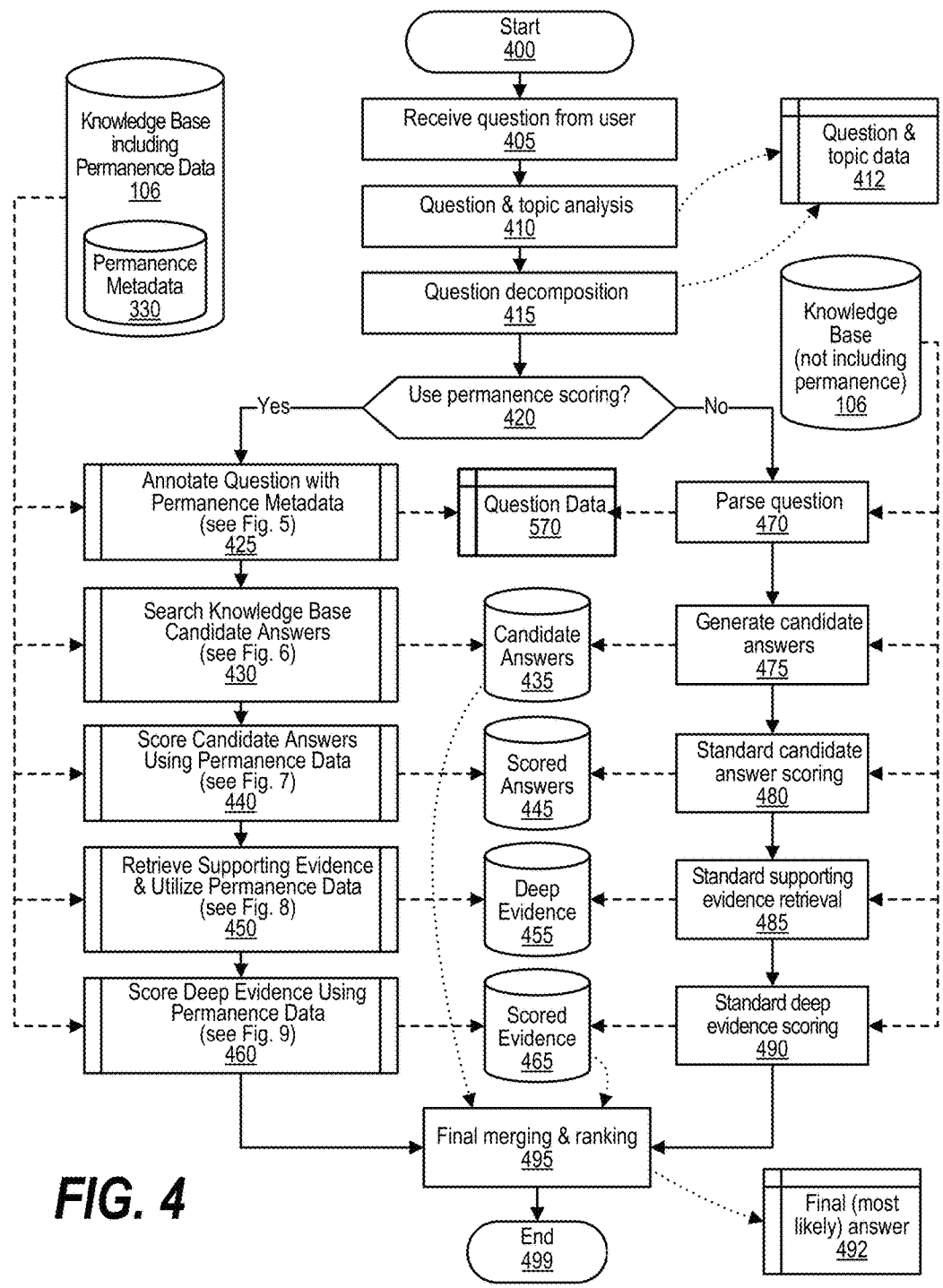
FIG. 4 is an exemplary high level flowchart that performs steps to/which/that apply a level of permanence to statements to influence confidence rankings.

FIG. 4 is an exemplary high level flowchart that performs steps apply a level of permanence to statements to influence confidence rankings. Processing commences at 400 whereupon, at step 405, the process receives a question from a user. At step 410, the process performs a question and topic analysis process to generate question and topic data. Process 410 stores the question and topic data in memory area 412. At step 415, the process performs a decomposition process on the question. The question decomposition results in additional data being stored to memory area 410.

The process determines as to whether to use permanence scoring when processing the user's question (decision 420). In one embodiment, the user specifies, such as with using an option, as to whether permanence scoring will be used, while in another embodiment, the determination of whether to use permanence scoring is based on the type of question posed to the system. If permanence scoring is being used, then decision 420 branches to the 'yes' branch to perform steps 425 through 460. On the other hand, if permanence scoring is not being used, then decision 420 branches to the 'no' branch to perform steps 470 through 490.

When permanence scoring is being utilized, steps 425 through 460 are performed. At predefined process 425, the process performs the Annotate Question with Permanence Metadata routine (see FIG. 5 and corresponding text for processing details). Predefined process 425 retrieves the permanence metadata from the corpus (data store 106) that includes permanence metadata store 330. Predefined process 425 stores the question data in memory area 570. At predefined process 430, the process performs the Search Knowledge Base Candidate Answers routine (see FIG. 6 and corresponding text for processing details). Predefined process 430 receives data from corpus 106 and outputs the candidate answers to data store 435. At predefined process 440, the process performs the Score Candidate Answers Using Permanence Data routine (see FIG. 7 and corresponding text for processing details). The permanence data to score the candidate answers is retrieved from corpus 106 and the resulting scored candidate answers are stored in data store 445. At predefined process 450, the process performs the Retrieve Supporting Evidence & Utilize Permanence Data routine (see FIG. 8 and corresponding text for processing details). Predefined process retrieves the supporting evidence from corpus 106 and stores the retrieved deep evidence documents in data store 455. At predefined process 460, the process performs the Score Deep Evidence Using Permanence Data routine (see FIG. 9 and corresponding text for processing details). The permanence data is retrieved from corpus 106 and the resulting scored deep evidence is stored in data store 465.

When permanence scoring is not being used, the process performs steps 470 through 490. At step 470, the process parses question and stores the parsed question data in memory area 570. At step 475, the process generates candidate answers using the traditional process without using permanence metadata and stores the resulting candidate answers in data store 435. At step 480, the process performs standard candidate answer scoring using the traditional process and stores the scored answers in data store 445. At step 485, the process performs a standard supporting evidence retrieval using a traditional process and stores the supporting deep evidence in data store 455. At step 490, the process performs a standard deep evidence scoring on the deep evidence without utilizing permanence metadata and stores the resulting scored deep evidence in data store 465.

After the question has been processed either by using permanence scoring with steps 425 through 460 or without permanence scoring using steps 470 through 490, step 495 is performed. At step 495, the process performs a final merging and ranking process and stores the most likely answer, or answer, in memory area 492 along with the confidence scores of the final answer(s). FIG. 4 processing thereafter ends at 499.

Figure 5:
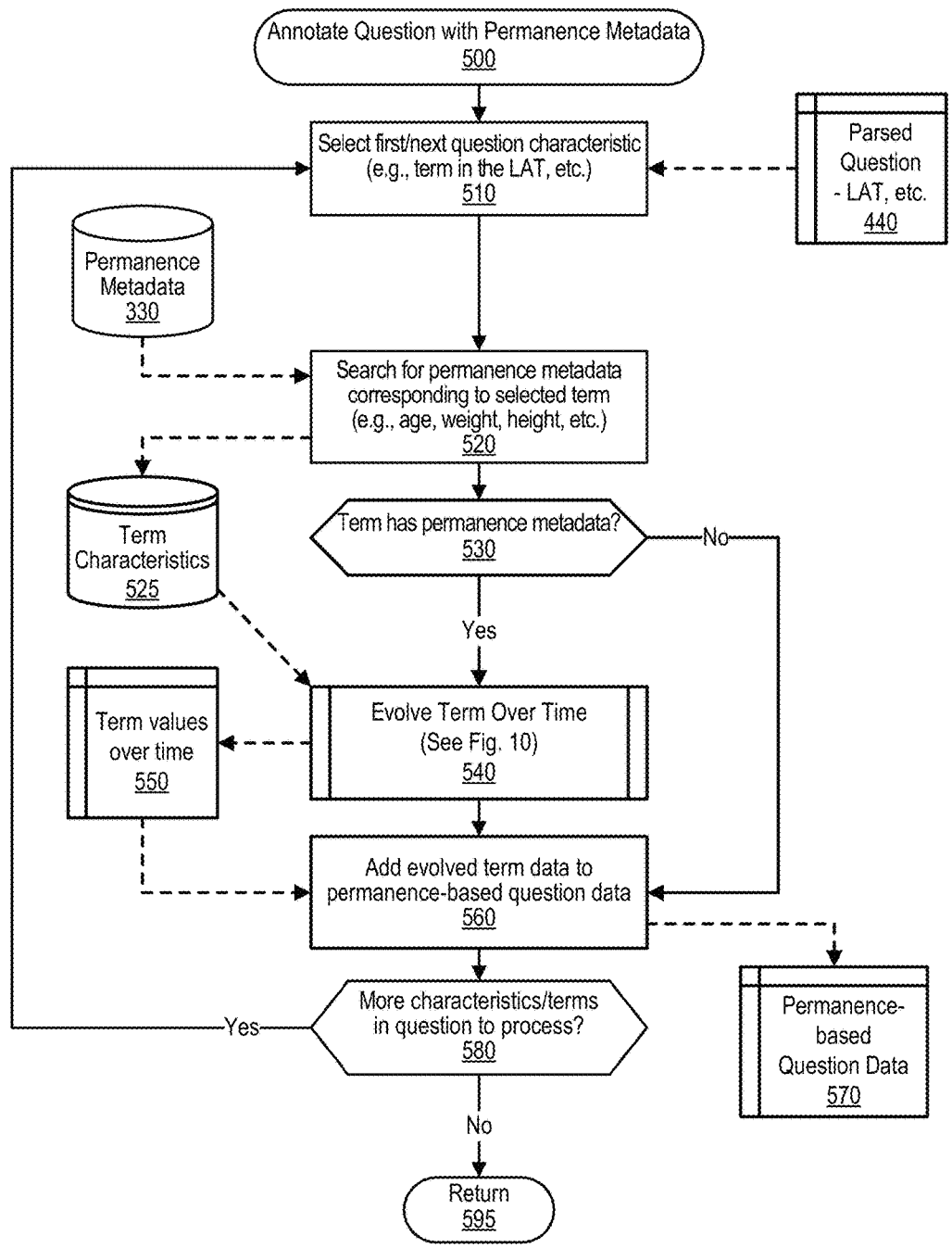
FIG. 5 is an exemplary flowchart that performs steps to annotate a question using permanence metadata.

FIG. 5 is an exemplary flowchart that performs steps to annotate a question using permanence metadata. Processing commences at 500, whereupon, at step 510, the process selects the first question characteristic (e.g., a term in the Lexical Answer Type (LAT), term in the focus, etc.). Step 510 retrieves the question characteristic data from parsed question data stored in memory area 440.

At step 520, the process searches for permanence metadata corresponding to the selected term, or question characteristic (e.g., age, weight, height, etc.). Step 520 retrieves the permanence metadata from data store 330. Step 520 stores the term characteristics and any associated permanence metadata in data store 525. The process determines as to whether term has permanence metadata (decision 530). If the term has permanence metadata, then decision 530 branches to the 'yes' branch whereupon, at predefined process 540, the process performs the Evolve Term Over Time routine (see FIG. 10 and corresponding text for processing details). Predefined process 540 retrieves the term characteristics and metadata from data store 525 and stores the predicted values for the term over a time period in memory area 550. On the other hand, the term does not have permanence metadata, then decision 530 branches to the 'no' branch bypassing predefined process 540.

At step 560, the process adds the evolved term data to the permanence-based question data that is stored in memory area 570. The process determines as to whether there are more characteristics and/or terms related to the question that need to be processed (decision 580). If there are more characteristics and/or terms related to the question that need to be processed, then decision 580 branches to the 'yes' branch which loops back to step 510 to select and process the next question characteristic from memory area 440. This looping continues until all of the question characteristics have been processed, at which point decision 580 branches to the 'no' branch and processing returns to the calling routine (see FIG. 4) at 595.

Figure 6:
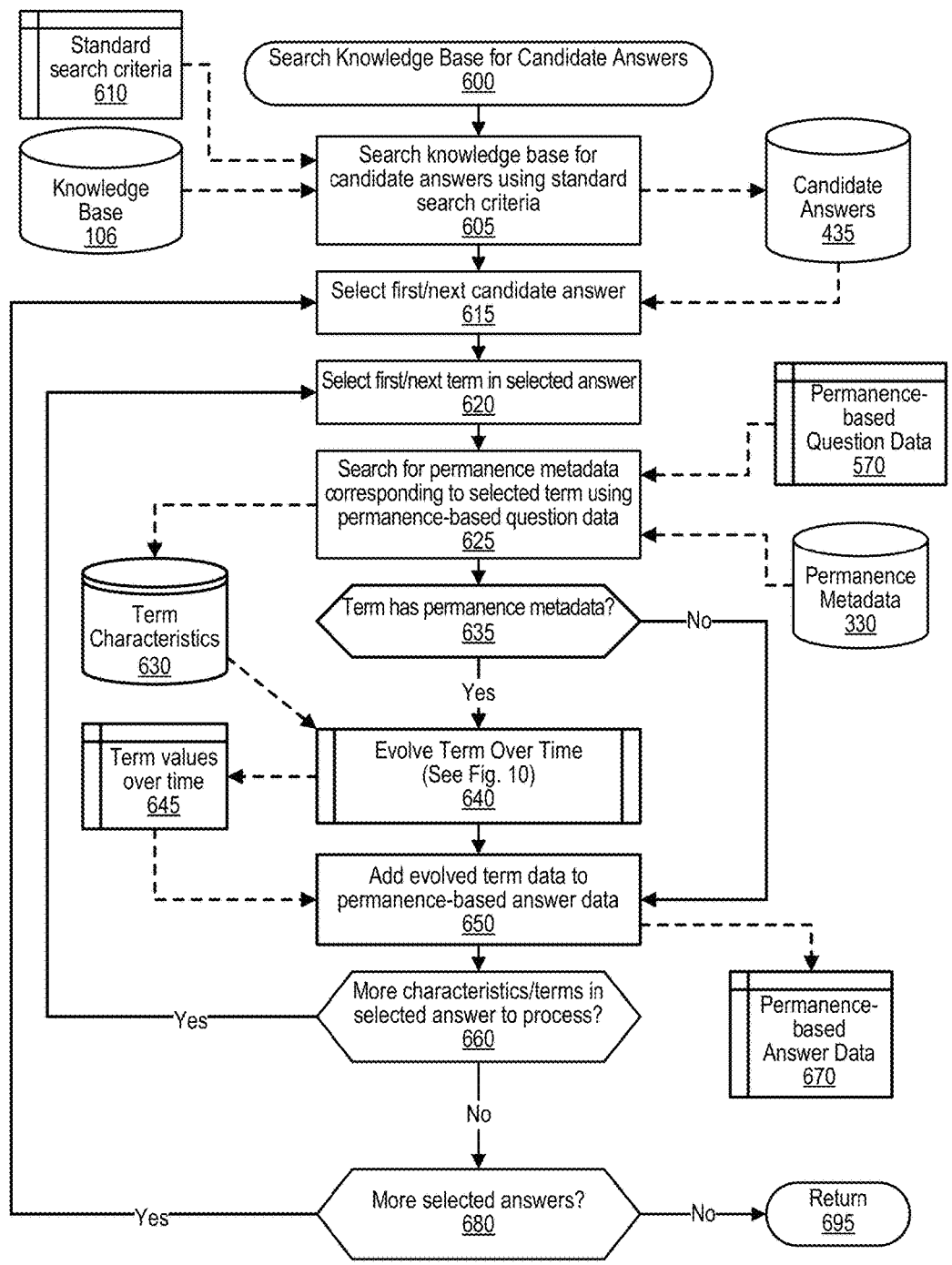
FIG. 6 is an exemplary flowchart that performs steps that utilize permanence metadata when searching a knowledge base for candidate answers.

FIG. 6 is an exemplary flowchart that performs steps that utilize permanence metadata when searching a knowledge base for candidate answers. Processing commences at 600, whereupon at step 605, the process searches knowledge base 106 for candidate answers using standard search criteria retrieved from memory area 610. The resulting candidate answers are stored in data store 435. At step 615, the process selects the first candidate answer from data store 435. At step 620, the process selects the first term included in the selected answer. As used herein, the word 'term' can refer to a word, a phrase, an expression, or the like.

At step 625, the process searches for permanence metadata that corresponds to the selected term using permanence-based question data retrieved from memory area 570 and from permanence metadata retrieved from data store 330. Step 625 stores the permanence metadata found for the term in characteristics data store 630.

The process determines as to whether the selected term has permanence metadata (decision 635). If the selected term has permanence metadata, then decision 635 branches to the 'yes' branch whereupon, at predefined process 640, the process performs the Evolve Term Over Time routine (see FIG. 10 and corresponding text for processing details). Predefined process 640 retrieves the term characteristics (term and metadata) from data store 630, and stores the predicted values of the term over time in memory area 645. On the other hand, if the selected term does not have permanence metadata, then decision 635 branches to the 'no' branch bypassing predefined process 640.

At step 650, the process adds the evolved term data retrieved from memory area 645 to permanence-based answer data that is stored in memory area 670. The process determines as to whether there are more characteristics and/or terms included in the selected candidate answer to process (decision 660). If there are more characteristics and/or terms included in the selected candidate answer to process, then decision 660 branches to the 'yes' branch which loops back to step 620 to select and process the next term from the selected candidate answer. This looping continues until there are no more characteristics and/or terms included in the selected candidate answer to process, at which point decision 660 branches to the 'no' branch.

The process determines as to whether there are more candidate answers to process (decision 680). If there are more candidate answers to process, then decision 680 branches to the 'yes' branch whereupon processing loops back to step 615 to select and process the next candidate answer. This looping continues until there are no more candidate answers to process, at which point decision 680 branches to the 'no' branch and processing returns to the calling routine (see FIG. 4) at 695.

Figure 7:
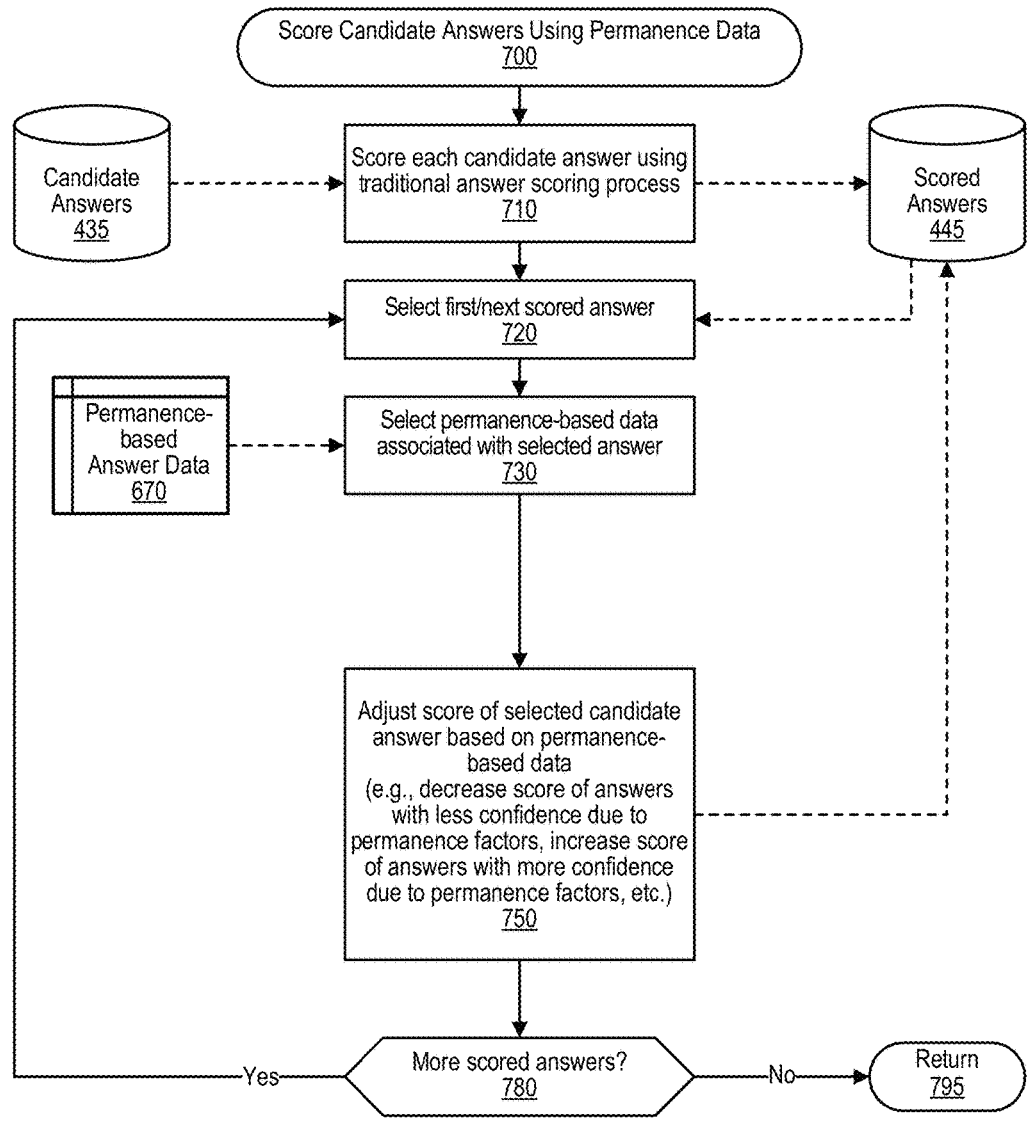
FIG. 7 is an exemplary flowchart that performs steps that scores candidate answers utilizing associated permanence metadata.

FIG. 7 is an exemplary flowchart that performs steps that scores candidate answers utilizing associated permanence metadata. Processing commences at 700, whereupon, at step 710, the process scores each candidate answer using a traditional answer scoring process. The candidate answers are retrieved from data store 435 and the scored candidate answers are stored in data store 445.

At step 720, the process selects the first scored candidate answer from data store 445. At step 730, the process selects the permanence-based data associated with the selected answer with the permanence-based data being retrieved from memory area 670. At step 750, the process adjusts the score of selected candidate answer based on permanence-based data (e.g., decrease score of answers with less confidence due to permanence factors, increase score of answers with more confidence due to permanence factors, etc.). For example, if the candidate answer relates to the weight of an individual, the confidence of the answer may be decreased if the candidate answer was derived from older sources (documents) of evidence. Likewise, a candidate answer derived from a very recent source may have its score increased due to the freshness of the data. In addition, other types of terms change more or less frequently (e.g., height, nationality, race, etc.) so the confidence values associated with different terms varies. The adjustment to the candidate answer's score is stored in data store 445.

The process determines as to whether there are more scored candidate answers to process (decision 780). If there are more scored candidate answers to process, then decision 780 branches to the 'yes' branch which loops back to select and process the next scored candidate answer. This looping continues until there are no more scored candidate answers to process, at which point decision 780 branches to the 'no' branch and processing returns to the calling routine (see FIG. 4) at 795.

Figure 8:
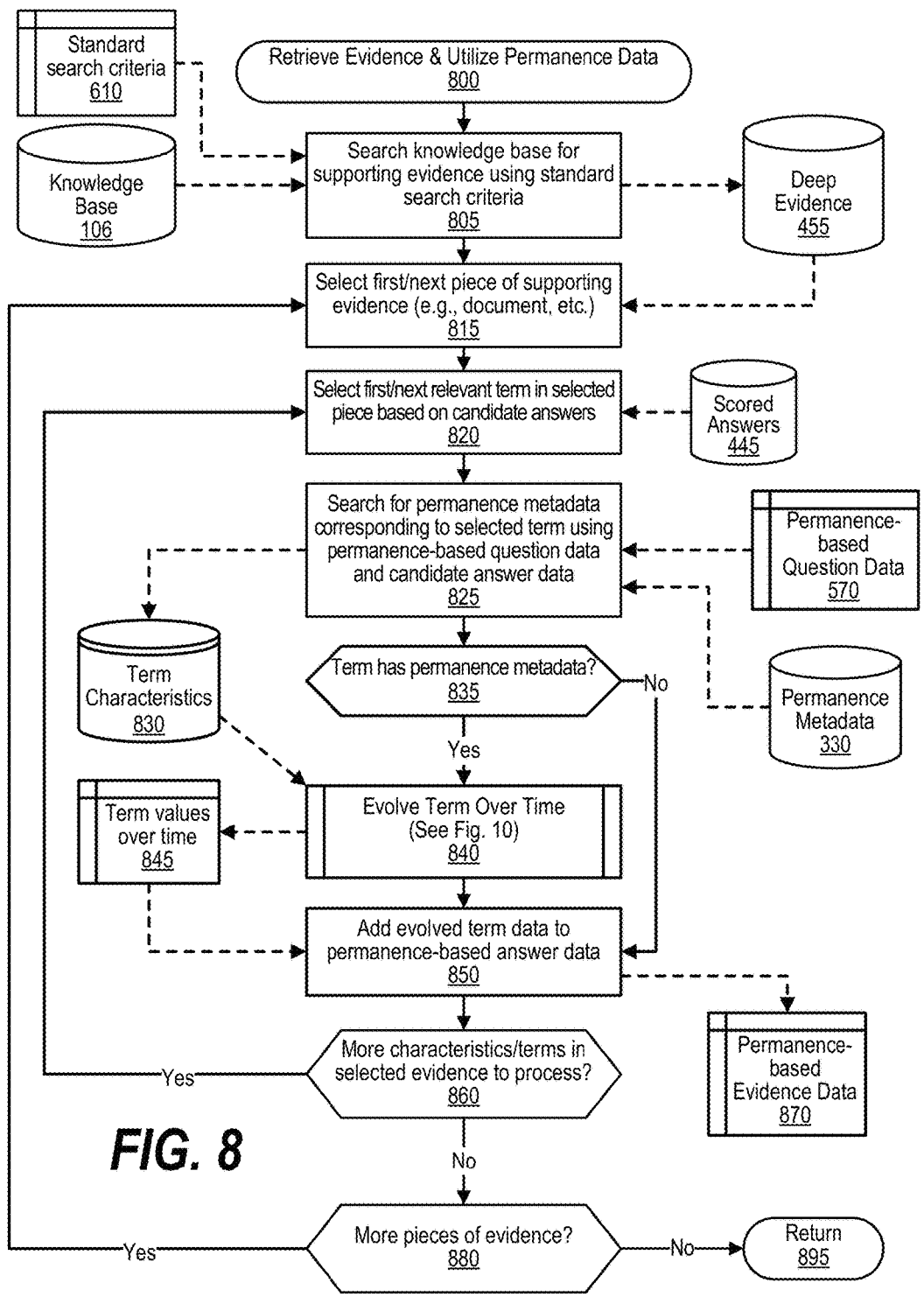
FIG. 8 is an exemplary flowchart depicting steps performed by a process that retrieves supporting evidence utilizing permanence data.

FIG. 8 is an exemplary flowchart depicting steps performed by a process that retrieves supporting evidence utilizing permanence data. Processing commences at 800, whereupon at step 805, the process searches knowledge base 106 for supporting evidence using standard search criteria retrieved from memory area 810. The resulting supporting evidence (e.g., documents, etc.) are stored in data store 455. At step 815, the process selects the first supporting evidence from data store 455. At step 820, the process selects the first term included in the selected supporting evidence.

At step 825, the process searches for permanence metadata that corresponds to the selected term using permanence-based question data retrieved from memory area 570 and from permanence metadata retrieved from data store 330. Step 825 stores the permanence metadata found for the term in characteristics data store 830.

The process determines as to whether the selected term has permanence metadata (decision 835). If the selected term has permanence metadata, then decision 835 branches to the 'yes' branch whereupon, at predefined process 840, the process performs the Evolve Term Over Time routine (see FIG. 10 and corresponding text for processing details). Predefined process 840 retrieves the term characteristics (term and metadata) from data store 830, and stores the predicted values of the term over time in memory area 845. If the selected term does not have permanence metadata, then decision 835 branches to the 'no' branch bypassing predefined process 840.

At step 850, the process adds the evolved term data retrieved from memory area 845 to permanence-based answer data that is stored in memory area 870. The process determines as to whether there are more characteristics and/or terms included in the selected deep evidence (document) to process (decision 860). If there are more characteristics and/or terms included in the selected deep evidence to process, then decision 860 branches to the 'yes' branch which loops back to step 820 to select and process the next term from the selected deep evidence. This looping continues until there are no more characteristics and/or terms included in the selected deep evidence to process, at which point decision 860 branches to the 'no' branch.

The process determines as to whether there are more deep evidence (documents) to process (decision 880). If there are more deep evidence (documents) to process, then decision 880 branches to the 'yes' branch whereupon processing loops back to step 815 to select and process the next deep evidence (document). This looping continues until there are no more deep evidence (documents) to process, at which point decision 880 branches to the 'no' branch and processing returns to the calling routine (see FIG. 4) at 895.

Figure 9:
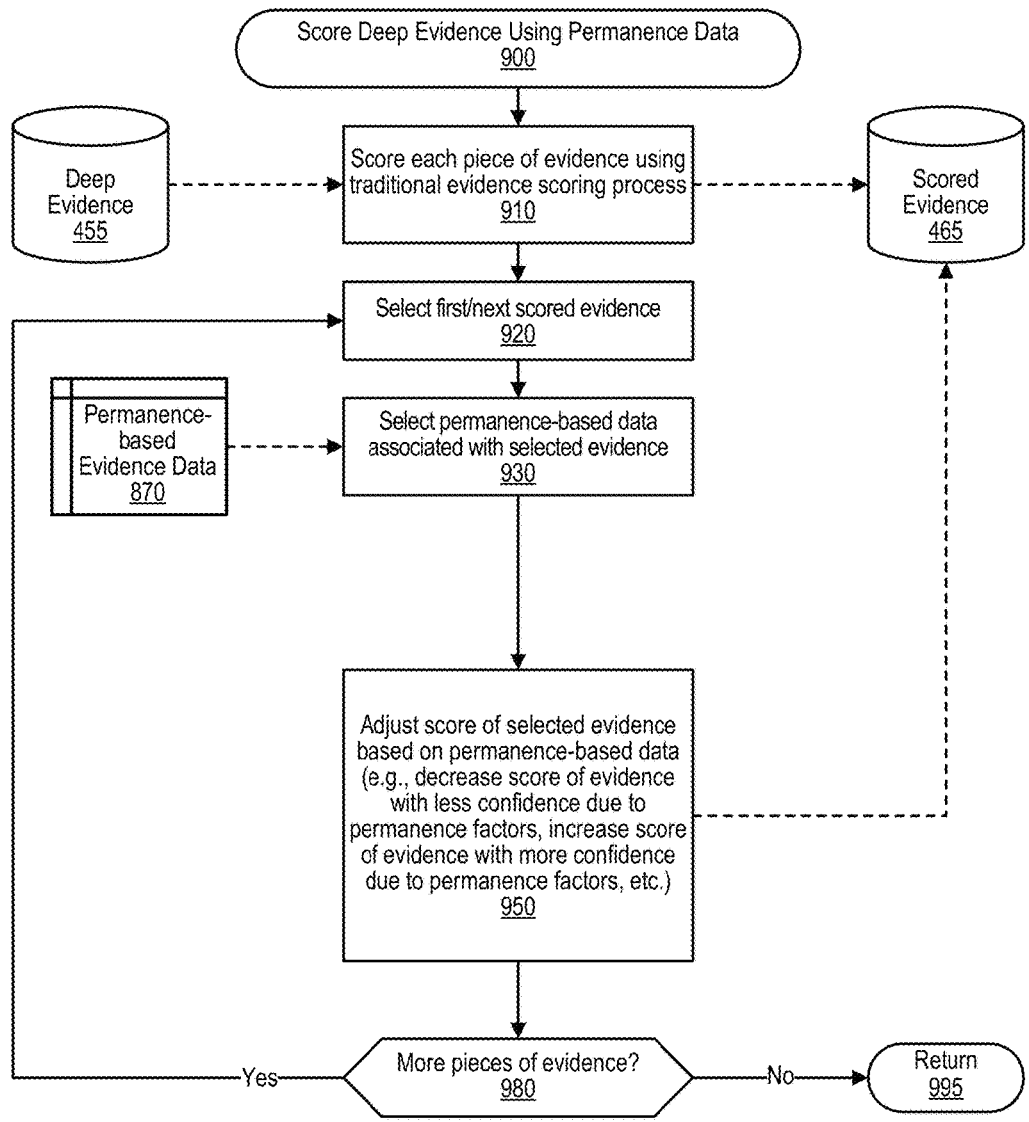
FIG. 9 is an exemplary flowchart depicting steps that score evidence using permanence metadata.

FIG. 9 is an exemplary flowchart that performs steps that scores deep evidence (documents) utilizing associated permanence metadata. Processing commences at 900, whereupon, at step 910, the process scores each piece of deep evidence (e.g., documents, etc.) using a traditional answer scoring process. The deep evidence documents are retrieved from data store 455 and the scored deep evidence are stored in data store 465.

At step 920, the process selects the first scored deep evidence from data store 445. At step 930, the process selects the permanence-based data associated with the selected answer with the permanence-based data being retrieved from memory area 670. At step 950, the process adjusts the score of selected deep evidence based on permanence-based data (e.g., decrease score of answers with less confidence due to permanence factors, increase score of answers with more confidence due to permanence factors, etc.). For example, if the deep evidence relates to the weight of an individual, the confidence of the answer may be decreased if the deep evidence was derived from older sources (documents) of evidence. Likewise, deep evidence derived from a very recent source may have its score increased due to the freshness of the data. In addition, other types of terms change more or less frequently (e.g., height, nationality, race, etc.) so the confidence values associated with different terms varies. The adjustment to the deep evidence's score is stored in data store 445.

The process determines as to whether there are more scored deep evidence (documents) to process (decision 980). If there are more scored deep evidences to process, then decision 980 branches to the 'yes' branch which loops back to select and process the next scored deep evidence. This looping continues until there are no more scored deep evidence to process, at which point decision 980 branches to the 'no' branch and processing returns to the calling routine (see FIG. 4) at 995.

Figure 10:
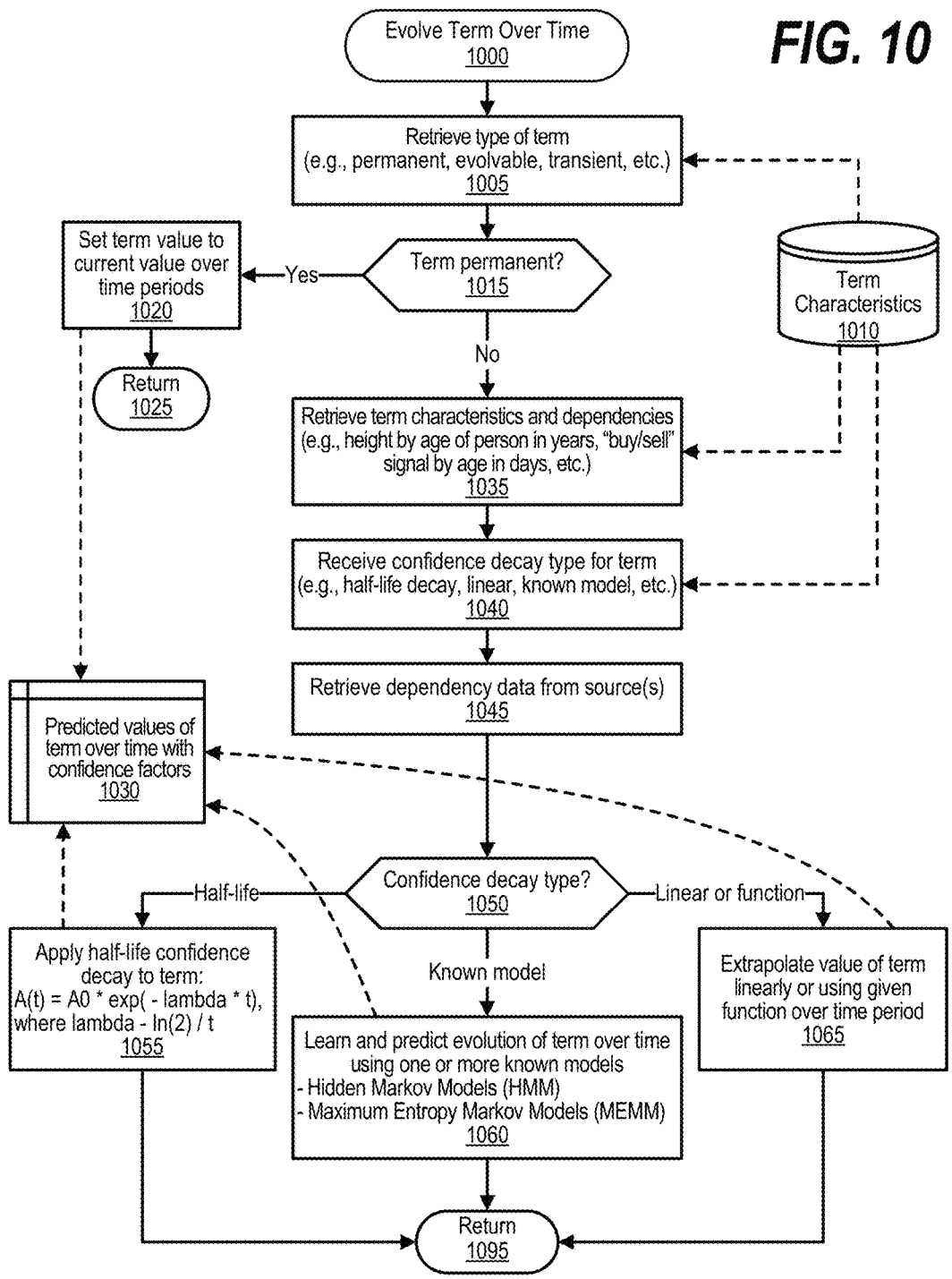
FIG. 10 is an exemplary flowchart depicting steps that evolve permanence data for a particular term over a period of time.

FIG. 10 is an exemplary flowchart depicting steps that evolve permanence data for a particular term over a period of time. Processing commences at 1000, whereupon, at step 1005, the process retrieves the type of term (e.g., permanent, evolvable, transient, etc.) from term characteristics data store 1010. Term characteristics data store includes data from the term characteristics data store from the routine that is calling the Evolve Term routine. The process determines as to whether the term is a permanent type of term (decision 1015). If the term is a permanent type, then decision 1015 branches to the 'yes' branch whereupon the term value is set to the current value as it does not change over time with the permanent values stored in predicted values memory area 1030 and processing returns to the calling routine at 1025.

Returning to decision 1015, if the term is not a permanent type, then decision 1015 branches to the 'no' branch and processing continues. At step 1035, the process retrieves the term characteristics and dependencies (e.g., height by age of person in years, "buy/sell" signal by age in days, etc.) from data store 1010. As previously mentioned, term characteristics data store includes data from the term characteristics data store from the routine that is calling the Evolve Term routine.

At step 1040, the process receives the confidence decay type that is being used for the term (e.g., half-life decay, linear decay, another known model of decay, etc.). The decay type can be a default decay type used for terms or can be term-specific so that, depending on the term that is being analyzed, a different decay type can be used.

At step 1045, the process retrieves dependency data from source(s). Dependency data relates to another variable that influences the decay of the term. For example, if the term is a person's height a piece of dependency data might be the age of the person. The confidence of a predicted height of a person that is thirty years old when the height was recorded will be higher than the predicted height of a child that is eight years old when the height was recorded as the predicted height of the child will likely change more than the height of the thirty year old adult.

The process determines as to the type of confidence decay type being used for this term (decision 1050). If the confidence decay type is a 'half-life' confidence decay type, then decision 1050 branches to the 'half-life' branch, whereupon, at step 1055, the process applies the half-life confidence decay to the term. In one embodiment, the half-life algorithm is $A(t)=A0*\exp(-\text{lambda}*t)$, where $\text{lambda}=\ln(2)/t$. The predicted values of the term over time along with the confidence values for such predicted values resulting from step 1055 are stored in memory area 1030.

If the confidence decay type is derived from a known model, then decision 1050 branches to the 'known model' branch, whereupon, at step 1060, the process learns and predicts the evolution of the term over time using one or more known models such as the Hidden Markov Models (HMM), the Maximum Entropy Markov Models (MEMM), and the like. The predicted values of the term over time along with the confidence values for such predicted values resulting from step 1060 are stored in memory area 1030.

If the confidence decay type is linear or a predefined function, then decision 1050 branches to the ' linear or function' branch, whereupon, at step 1065, the process extrapolates the value of the term linearly or using given function over time period. The predicted values of the term over time along with the confidence values for such predicted values resulting from step 1065 are stored in memory area 1030.

Memory area 1030 is returned to the calling routine to be used as the Terms over time (memory area 550 in FIG. 5, memory area 645 in FIG. 6, memory area 845 in FIG. 8, etc.). FIG. 10 processing thereafter returns to the calling routine at 1095.

Half Life Decay Implementation Details

One model for the evolution of a feature over time is the decaying exponential. Given a feature whose value when "current" (age=0) is A0, its value at a point (age) t time units in the past is:

$$A(t)=A0*\exp(-lambda*t) \text{ where } lamda=\ln(2)/t$$

A buy signal feature (+10) about financial equities would make A0=+10. whereas a sell signal would make A0=−10. We allow the value of A0 to be between −10 and +10 if there is uncertainly in the value. We have to determine the "half-life" of buy/sell signals. We ask: How far in the past would a buy signal have to be before it should have ½ the weight of a current (age=0) signal. Let's say an analyst's intuition is 30 days. Then the analyst is stating the half-life of buy/sell signals is 30 days. That means lambda=ln(2)/30 days=0.0231 days$^{-1}$. In this example, the units are actually "inverse day" or day raised to the −1 power (day$^{-1}$).

Plugging Various Values of t (Age):

| Age in Days | A0 = 10<br>Lambda = 0.023104906<br>Value of A(t) |
| --- | --- |
| 0 | 10.000 |
| 15 | 7.071 |
| 30 | 5.000 |
| 45 | 3.536 |
| 60 | 2.500 |
| 75 | 1.768 |
| 90 | 1.250 |

In this table, the first column is the age of the feature in days. The second column has A0=10.0 (top element), lambda=0.231 (next element) and the value of A(t) for each of the ages in the first column. Notice that the value for 0 half-lives is the full value of A0=10.0, the value for 1 half-life (30 days) is indeed ½ of A0, the value for 2 half-lives is ¼ of A0, and the value for 3 half-lives is ⅛ of A0. But this method also gives results for ANY number of days in the past. Also there are no discontinuous jumps in the value; values decay smoothly.

Above the selection of the half-life was based on human intuition. We can partially automate this by computing features for B*HalfLife, C*HalfLife and D*HalfLife (where B=0.5, C=1.0 and D=1.5, or other suitable values) and adding them all to a machine learning model. We select the final half-life by picking the feature (B, C or D) with the largest weight in the ML model (the feature that was most predictive). Multiple iterations of this can be run, to hone in on the most informative half-life. The final model would use a single half-life value.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
one or more data stores accessible by at least one of the processors;
a memory coupled to at least one of the processors; and
a set of computer program instructions stored in the memory and executed by at least one of the processors in order to perform actions of:
determining a plurality of permanence values corresponding to a plurality of terms included in a corpus of a question answering (QA) system, wherein the plurality of permanence values adjusts over time based on one or more rates of change of one or more term characteristics corresponding to the plurality of terms;
identifying a plurality of candidate answers to a question received at the question answering system, wherein each of the plurality of candidate answers comprises at least one of the plurality of terms;
for each of a selected one of the plurality of candidate answers:
identifying at least one of the plurality of permanence values corresponding to the at least one term comprised in the selected candidate answer; and
computing a score of the selected candidate answer based on the identified at least one permanence value, wherein the score indicates a time-based confidence of the selected candidate answer; and
ranking, by the question answer system, the plurality of candidate answers based on their corresponding score, wherein the ranking reflects the time-based confidence established for each of the plurality of candidate answers.

2. The information handling system of claim 1 wherein the steps further comprise:
wherein the plurality of permanence values of the plurality of terms is determined based on one of the one or more rates of change of their respective one of the plurality of terms.

3. The information handling system of claim 2 wherein the steps further comprise:
retrieving a dependency data item corresponding to a selected one of the plurality of terms, wherein the dependency data item affects the rate of change of the selected term.

4. The information handling system of claim 3 wherein the steps further comprise:
identifying a confidence decay type;
selecting a decay algorithm corresponding to the confidence decay type; and
applying the selected decay algorithm to the selected term, the application of the selected decay algorithm resulting in a prediction of a plurality of term values over a time period for the selected term.

5. The information handling system of claim 4 wherein the decay algorithm is a half-life confidence algorithm that predicts a time displacement where a first confidence of a current term value is twice a second confidence of a predicted term value.

6. The information handling system of claim 1 wherein the steps further comprise:
identifying one or more question characteristics pertaining to the question;
retrieving a permanence metadata corresponding to a selected one of the question characteristics; and
predicting a plurality of values corresponding to the selected question characteristics.

7. A computer program product stored in a computer readable storage medium, comprising computer program code that, when executed by an information handling system, causes the information handling system to perform actions comprising:
determining a plurality of permanence values corresponding to a plurality of terms included in a corpus of a question answering (QA) system, wherein the plurality of permanence values adjusts over time based on one or more rates of change of one or more term characteristics corresponding to the plurality of terms;
identifying a plurality of candidate answers to a question received at the question answering system, wherein each of the plurality of candidate answers comprises at least one of the plurality of terms;
for each of a selected one of the plurality of candidate answers:
identifying at least one of the plurality of permanence values corresponding to the at least one term comprised in the selected candidate answer; and
computing a score of the selected candidate answer based on the identified at least one permanence value, wherein the score indicates a time-based confidence of the selected candidate answer; and
ranking, by the question answer system, the plurality of candidate answers based on their corresponding score, wherein the ranking reflects the time-based confidence established for each of the plurality of candidate answers.

8. The computer program product of claim 7 wherein the steps further comprise:
wherein the plurality of permanence values of the plurality of terms is determined based on one of the one or more rates of change of their respective one of the plurality of terms.

9. The computer program product of claim 8 wherein the steps further comprise:
retrieving a dependency data item corresponding to a selected one of the plurality of terms, wherein the dependency data item affects the rate of change of the selected term.

10. The computer program product of claim 9 wherein the steps further comprise:
identifying a confidence decay type;
selecting a decay algorithm corresponding to the confidence decay type; and
applying the selected decay algorithm to the selected term, the application of the selected decay algorithm resulting in a prediction of a plurality of term values over a time period for the selected term.

11. The computer program product of claim 10 wherein the decay algorithm is a half-life confidence algorithm that predicts a time displacement where a first confidence of a current term value is twice a second confidence of a predicted term value.

12. The computer program product of claim 7 wherein the steps further comprise:
identifying a plurality of documents as supporting evidence corresponding to the plurality of candidate answers, wherein a score corresponds to each of the plurality of documents;
identifying one or more of the terms with identified permanence that is included in a selected one or the plurality of documents;
applying the identified permanence corresponding to the selected one of the documents, the applying resulting in an adjustment to the score corresponding to the selected one of the documents; and
performing the identifying and the applying for each of the plurality of documents.

* * * * *